Oct. 7, 1930.　　　C. G. CURTIS　　　1,777,827
TWO-CYCLE INTERNAL COMBUSTION ENGINE
Filed March 15, 1927　　2 Sheets-Sheet 1

Inventor,
Charles G. Curtis,
By Samuel W. Balch
Attorney.

Inventor,
Charles G. Curtis,
By Samuel W. Balch
Attorney.

Patented Oct. 7, 1930

1,777,827

UNITED STATES PATENT OFFICE

CHARLES G. CURTIS, OF NEW YORK, N. Y.

TWO-CYCLE INTERNAL-COMBUSTION ENGINE

Application filed March 15, 1927. Serial No. 175,464.

This invention relates to the scavenging of two-cycle internal combustion engines of the class commonly known as port-scavenged engines.

The object of this invention is to provide a means or system of scavenging two-cycle engines of the port-scavenged type, which will have a high scavenging efficiency, so that maximum power can be obtained from a given size cylinder, and a higher overall engine efficiency be atttained than heretofore possible.

Although the two-cycle engine develops twice as many power strokes in a given number of revolutions, this indicated advantage over the four-cycle engine is only partially realized in practice because of poor scavenging; due to this poor scavenging, the charge of air in which combustion takes place is much less pure than in the four-cycle engine, and therefore it is not possible to burn as much fuel efficiently in this charge and to operate the engine with as high a mean effective pressure. The poor scavenging also impairs the overall efficiency because of imperfect combustion and because a considerable amount of power is required to furnish the necessary scavenging air under pressure. Furthermore the defective scavenging has prevented the operation of two-cycle engines at as high a speed of revolution as the four-cycle type. These defects in the two-cycle engine resulting in less power per unit of piston displacement have been serious enough to restrict its commercial application and to prevent its supplanting the four-cycle engine in many cases where its advantages would otherwise have been controlling.

In port-scavenged two-cycle engines the scavenging and the charging with fresh air is accomplished by blowing in air under pressure through ports in the lower end of the cylinder. Due to the difficulty of getting a large amount of scavenging air in through the ports, the port area being necessarily restricted, and to the fact that the ports are open for a much shorter space of time than are the valves in the four-cycle type, the scaveninging efficiency in comparison with the four-cycle type has been poor and the revolutions necessarily relatively low. By using a sufficiently large excess of scavenging air, the scavenging efficiency can be improved, but to furnish this air a larger scavenging air pump is required and to get this amount of air through the ports in the short period of time available, especially in high speed engines, requires either that the ports should be very long, or the scavenging air pressure high. Lengthening the ports necessarily shortens the compression stroke and thereby reduces the capacity of the engine and increasing the scavenging pressure necessarily so increases the power required to furnish this scavenging air that it becomes a very considerable fraction of the power developed by the engine and therefore impairs its overall efficiency.

Many attempts have been made to improve port-scavenging by various methods and arrangements of ports, but these have lacked elements necessary for efficient and practical operation and have therefore met with no great commercial success. Extensive experiments carried on by me have shown that a number of contributory features are essential or important for successful scavenging; both the inlet and exhaust ports should occupy a minimum fraction of the length of the stroke; the total area of the inlet ports as well as the outlet ports should be a maximum consistent with a given height of the port; the air streams should be directed in such a way as to cause the air to rise up substantially on the inlet side of the cylinder to the cylinder cover and pass down on the other side of the cylinder to the exhaust with the least amount of eddies. It is possible by making the inlet ports sharply oblique in the direction of the axis of the cylinder to cause the air streams to rise to the cylinder cover largely on the inlet side, but to get the benefit of this upward direction in any material degree requires that the port where it pierces the cylinder wall be very high, otherwise the area of the ports would be very small compared with what it would be if they were made more nearly horizontal. If on the other hand, to obtain the requisite port area the ports are made more or less horizontal, then the inlet ports at the middle of the bank have such strong velocity components tending to carry the air across the cylinder direct to the exhaust that the scavenging is very poor.

I have found that by directing the ports occupying the end portions of the inlet port bank so that their velocity components are made to oppose those from the middle ports the tendency to cross the cylinder can be largely overcome and the air made to flow toward the combustion end mainly on that side of the cylinder carrying the ports. The piston heads need carry no protruding baffles but can be of simple contour such as for example domes, cones, frustrums of either which are desirable from a practical point of view, or they may have flat heads.

It is necessary, in order to secure a high overall engine efficiency, to attain not only a high scavenging efficiency (that is a thorough clearing out of the gas) but provision must be made to do this as quickly as possible and with the least expenditure of negative work of compression. Therefore the air inlet ports are shown as covering in a bank substantially all the available arc of circumference and are so arranged and directed that a large inlet area is provided. The ports must not cut the cylinder wall at angles sufficiently oblique, vertically, to affect materially their total virtual area. By making the air inlet ports horizontal in combination with a convex piston head of simple contour, the port area may be reduced, as for example, by omitting one or more of the middle ports. For the scavenging efficiency is somewhat improved by omitting the middle port and therefore a somewhat smaller amount of scavenging air is required.

In double acting engines the use of oblique ports pointing toward the combustion end of the cylinder are particularly undesirable not only because of the reduction of port area but also because this construction necessitates the use of a separate set of ports for each end of the cylinder.

Protruding baffles on the piston head to deflect or guide the incoming air toward the combustion end of the cylinder are troublesome and generally undesirable in large cylinders. They are subject to heat strains, they increase the danger of burning the head and they make it difficult to arrange a good combustion chamber.

The embodiment of my invention herein illustrated and described comprises air inlet ports arranged in a substantially continuous bank covering substantially all the available arc of circumference, the arrangement of ports and piston head contour being such that the velocity components of the air streams from the middle ports are opposed, neutralized or overcome by the velocity components from the other ports. It is also essential that the middle ports of the bank should be given a direction which is more or less radial (that is they should point more or less to the exhaust side of the cylinder) and hence must have velocity components tending to carry the air issuing from these ports across the cylinder. Otherwise these ports would be so oblique that their effective width would be of too little value. For example, if the middle ports were given a direction at right angles to a radius through the centre of the inlet arc then due to their obliquity to the cylinder wall, the effective area of these ports would be too small to be of practical value. The ports are shown as being what are commonly termed horizontal ports (that is ports introducing air generally at right angles to the plane of the cylinder axis) and the piston heads have simple contours.

By the expression "simple contours" I mean for example, domes and cones or frustrums of either or flat heads. In other words the expression is meant to include all shapes free from objectional protruding baffles. Those shapes which help to reduce the harmful velocity components of the middle ports by causing the air streams from those ports to be deflected away from the exhaust ports and which provide a smooth guide upwardly inclined for the streams from the non-radial end ports of the bank whereby the direction of the resultant component (which due to the middle ports would normally carry the air across the cylinder) is changed so that the air is directed toward the combustion chamber end of the cylinder without crossing the cylinder until the combustion chamber end is reached, are desirable.

This invention when applied to a double-acting engine helps to equalize the power developed on the two sides of the piston. If radial inlet ports are used or if ports directing the incoming air-streams to that side of the cylinder opposite the inlet are used in double-acting engines, both volume and scavenging efficiency are unequal on the opposite sides of the piston; the presence of the piston rod in this case reduces not only the volume but the scavenging efficiency. With ports in accordance with this invention, the presence of the piston rod increases the scavenging efficiency. This gain in scavenging efficiency offsets the loss in volume and thus operates to equalize the power developed on the two sides of the piston.

In the accompanying two sheets of drawings which form a part of this specification, Figure 1 is a section elevation of a double-acting internal combustion engine, generally of the Diesel type on the line I—I of Fig. 2.

Figure 1:
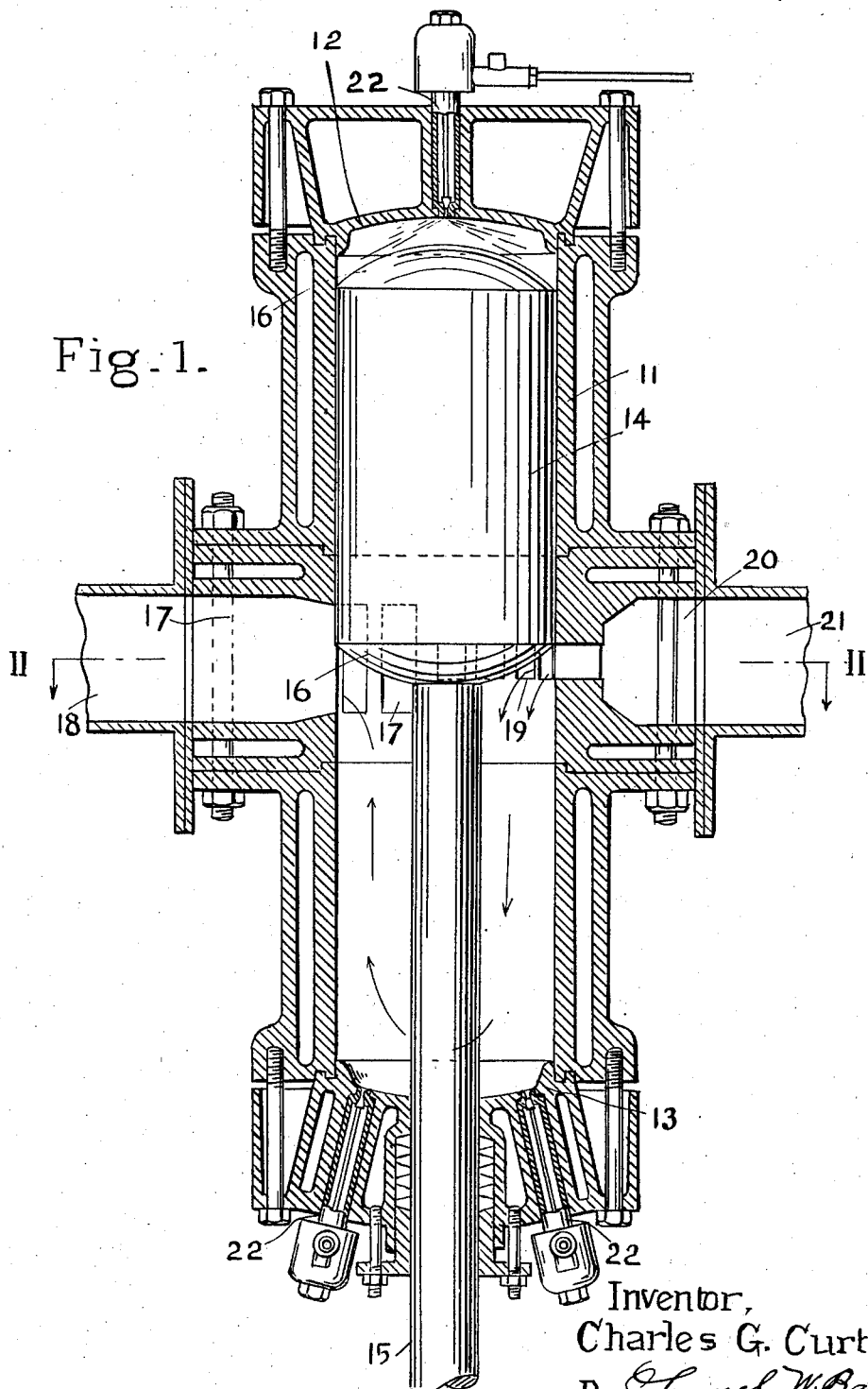

Referring first to Fig. 1, the cylinder 11 is provided with the usual cylinder heads 12 and 13 at the top and bottom. A piston 14 is connected with a piston rod 15. The piston has top and bottom heads 16, 16 both of which are dome-shaped. This form of piston head has been found to operate efficiently and satisfactorily with the scavenging system herein set forth.

Figure 2:
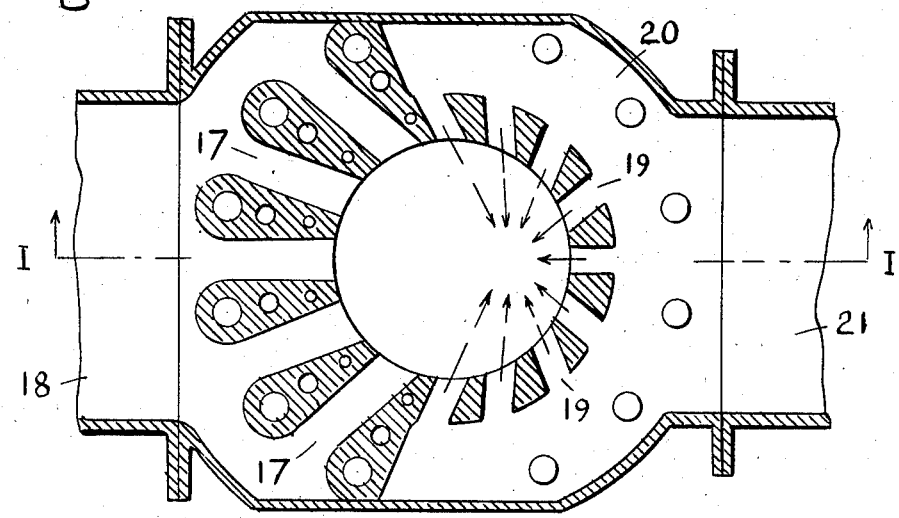
Fig. 2 is a section taken on the line II—II of Fig. 1 which illustrates the port ring.
Figure 3:
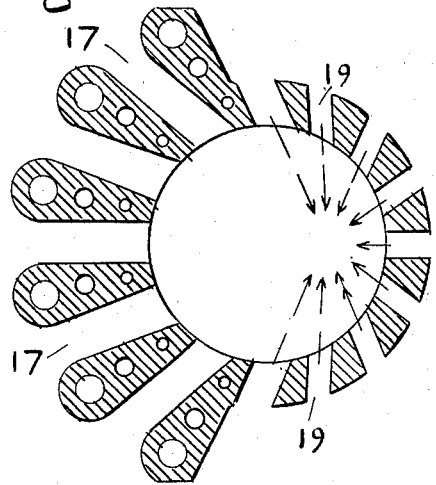
Fig. 3 is a section of a modification of the port ring in which the end ports of the row of inlet ports are larger than the other ports, otherwise it is similar to Fig. 2.
Figure 4:
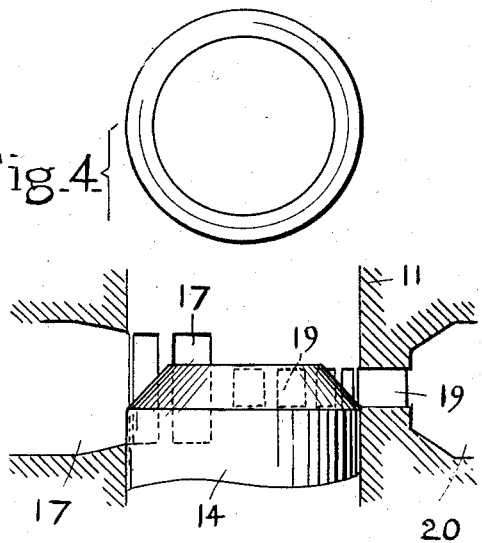
Fig. 4 shows in plan and elevation a piston head which is a frustum of a cone.

Referring to Figs. 2 and 3 on one side of the cylinder arranged in an arc of about half a circle are exhaust ports 17, 17 which open into an exhaust passage 18.

On the other side of the cylinder, that is opposite the exhaust ports are the air inlet ports 19, 19. Substantially all the arc not used for exhaust is used for these air inlet ports. They are shorter than the exhaust ports. Taken together they are sufficient to admit the requisite amount of scavenging air in the time available for scavenging. These inlet ports open from a chamber or air belt 20 which is supplied with scavenging air through a conduit 21 at a pressure above atmospheric pressure. According to this invention, these inlet ports or passages through which the air flows into the cylinder are formed so that the air streams issuing from the middle ports of the arc have velocity components tending to carry the air across the cylinder; and the streams from the end ports of the arc have velocity components in the opposite direction whereby with the help of the piston head the resultant velocity is toward the combustion chamber end of the cylinder, and the incoming air is kept generally to the side of the cylinder carrying the air inlet ports.

Nozzles 22, 22 are set in the cylinder head for injecting the fuel oil.

It will be seen that the streams of air coming into the cylinder from the ports at the ends of the arc of inlet ports oppose the streams coming from the ports located in the middle section of the arc, restricting the air against spreading or fanning out. This effect may be accentuated by enlarging the area of the inlet ports which lie at the ends of the arc as illustrated in Fig. 3. The piston heads illustrated help to turn the air toward the combustion chamber ends of the cylinder, and to guide the streams smoothly from the end ports to their meeting with the streams from the middle ports, but are not necessary to the invention. The result is that the incoming air is kept generally to the side of the cylinder which carries the air inlet ports and is turned up in the form of a rising column located generally on that side of the cylinder in which the inlet ports are located. The air projected with sufficient velocity in a column on that side of the cylinder, strikes the cylinder head and comes back on the other side of the cylinder and thus displaces the gas efficiently.

It will be noted that the inlet ports and exhaust ports illustrated are what are commonly called horizontal ports, whereby these ports have maximum area for a given height in the direction of the axis of the cylinder. I have found in practice that equally good scavenging efficiency is obtained with this arrangement as where radial ports cut the cylinder wall at an angle materially less than ninety degrees; the area is greater in the horizontal port arrangement hence the negative work of compression is reduced and the overall engine efficiency is raised. Then, too, the horizontal port arrangement permits the use of one set of ports to supply the two ends of a double-acting cylinder, alternately.

The cycle of operation of an engine embodying this invention does not differ from that of the well-known two-cycle engines now in commercial operation and hence need not be here described. The piston uncovers the exhaust ports early enough in the stroke to permit the pressure to drop to or below the scavenging pressure before the inlet ports are uncovered in accordance with the usual practice in a two-cycle engine.

The invention herein set forth is applicable generally to port scavenging two-cycle engines whether low speed or high speed, whether single acting or double acting, whether operating with air injection or mechanical injection, and whether operating on an atmospheric or on a supercharged cycle and with various types of piston heads. The scavenging air is supplied at a pressure which should be different for different types of engines; for example, at 1½ pounds gage or less pressure for slow speed atmospheric engines, somewhat higher pressure in the case of a high speed atmospheric engine, and still higher for a supercharged engine.

What I claim as new and desire to secure by Letters Patent of the United States, is—

1. A two-cycle internal combustion engine comprising a cylinder having a substantially continuous bank of air-inlet ports on one side, the ports being so directed that the admitted air forms a mass on the inlet side of the cylinder toward the piston end and so that the tendency of the velocity components of the streams of air admitted through the ports lying at the middle of the bank to carry the air across the cylinder is retarded by the velocity components of the streams of air admitted through the ports lying at the ends of the bank whereby the air rises on the inlet side in a substantially united column to the cylinder cover.

2. An engine according to claim 1 in which parts in the end portions of the air-inlet bank are so directed that the air admitted through them enters the cylinder in a plane approximately at right angles to the longitudinal axis of the cylinder.

3. An engine according to claim 1 in which all the ports deliver their air in a plane approximately at right angles to the longitudinal axis of the cylinder.

4. An engine according to claim 1 in which ports in the end portions of the air-inlet bank are of greater area than the ports in the middle portion of the bank.

5. A double acting engine according to claim 1 in which a single set of air-inlet ports serve the upper and lower parts of the cylinder alternately.

6. A two-cycle internal combustion engine comprising a cylinder having exhaust ports and a substantially continuous bank of air-inlet ports opposite the exhaust ports, a piston controlling the flow through the exhaust and the inlet ports, the ports in the middle portion of the inlet bank being directed toward the exhaust-port side of the cylinder and those in the end portions of the bank being directed back toward the inlet-port side of the cylinder in such manner that the air streams issuing from the end ports meet the streams from the middle ports on the inlet side of the cylinder toward the piston end and the velocity components toward the inlet side of the cylinder of the streams from the end ports oppose the direct flow of the middle streams toward the exhaust side of the cylinder and tend to confine the air to the inlet side of the cylinder and cause it to rise generally on that side to the cylinder cover end of the cylinder.

7. A two-cycle internal combustion engine comprising a cylinder having exhaust ports and a substantially continuous bank of air-inlet ports opposite the exhaust ports, a piston controlling the flow through the exhaust and the inlet ports, the ports in the middle portion of the inlet bank being directed toward the exhaust-port side of the cylinder and those in the end portions of the bank being directed back toward the inlet port side of the cylinder in such manner that the velocity components toward the inlet side of the cylinder of the streams from the end ports oppose the direct flow of the middle streams toward the exhaust side of the cylinder, the port arrangement being such that the distance between the tops of the ports and the piston when the ports are open controls and limits the effective inlet area.

8. An engine according to claim 6 in which ports in the end portions of the air-inlet bank are so directed that the air admitted through them enters the cylinder in a plane approximately at right angles to the longitudinal axis of the cylinder.

9. An engine according to claim 6 in which all of the inlet ports deliver their air in a plane approximately at right angles to the longitudinal axis of the cylinder.

10. An engine according to claim 6 in which the ports in the end portions of the air-inlet bank are of greater area than the ports in the middle portion of the bank.

11. A double-acting engine according to claim 6 in which a single set of air-inlet ports serve the upper and lower parts of the cylinder alternately.

12. A two-cycle internal combustion engine comprising a cylinder having exhaust ports and a substantially continuous bank of air-inlet ports opposite the exhaust ports, a piston controlling the flow of gas and air through the exhaust and the inlet ports, the inlet ports in the middle section of the bank being directed toward the exhaust-port side of the cylinder and those in the end sections of the bank being directed back toward the inlet-port side of the cylinder, the port arrangement being such that the distance between the tops of the ports and the piston when the ports are open controls and limits the effective inlet area.

CHARLES G. CURTIS.